United States Patent
Skoglund et al.

(10) Patent No.: US 10,932,478 B2
(45) Date of Patent: Mar. 2, 2021

(54) ICE CREAM MACHINE AND A METHOD FOR PRODUCING AN ICE CREAM PRODUCT USING AN ICE CREAM MACHINE

(71) Applicant: Tetra Laval Holdings & Finance S.A., Pully (CH)

(72) Inventors: Tomas Skoglund, Lund (SE); Ole Bendixen, Galten (DK); Tommy Bonde, Silkeborg (DK); Per Henrick Hansen, Malling (DK); Kurt Kristensen, Tranbjerg (DK); Ejvind Waldström, Risskov (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 230 days.

(21) Appl. No.: 15/575,866

(22) PCT Filed: Jun. 16, 2016

(86) PCT No.: PCT/EP2016/063881
§ 371 (c)(1),
(2) Date: Nov. 21, 2017

(87) PCT Pub. No.: WO2016/202920
PCT Pub. Date: Dec. 22, 2016

(65) Prior Publication Data
US 2018/0139984 A1    May 24, 2018

(30) Foreign Application Priority Data
Jun. 18, 2015    (SE) ........................................ 1550849

(51) Int. Cl.
*A23G 9/22* (2006.01)
*A23G 9/26* (2006.01)
(Continued)

(52) U.S. Cl.
CPC ............... *A23G 9/221* (2013.01); *A23G 9/22* (2013.01); *A23G 9/26* (2013.01); *A23G 9/281* (2013.01);
(Continued)

(58) Field of Classification Search
CPC .......... A23G 9/221; A23G 9/26; A23G 9/281; A23G 9/285
See application file for complete search history.

(56) References Cited

U.S. PATENT DOCUMENTS 2,794,404 A    6/1957 Joseph
4,044,161 A    8/1977 Tanara
(Continued)

FOREIGN PATENT DOCUMENTS

CN    1311638    4/2007
EP    0543628 A1    5/1993
(Continued)

OTHER PUBLICATIONS

International Search Report from corresponding PCT Application No. PCT/EP2016/063881 dated Sep. 7, 2016 (3 pages).
(Continued)

*Primary Examiner* — Ryan M Ochylski
(74) *Attorney, Agent, or Firm* — Finnegan, Henderson, Farabow, Garrett & Dunner, LLP

(57) ABSTRACT

The invention relates to an ice cream machine having a filling zone and an emptying zone. The ice cream machine comprises a rotatable unit having a radial extension, a mould for receiving ice cream, the mould being arranged to rotate with the rotatable unit, an extrusion nozzle for extruding ice cream into the mould, the extrusion nozzle being arranged at the filling zone. The ice cream machine further comprises an ejection mechanism for ejecting ice cream radially out of the mould at the emptying zone. The invention also relates to a
(Continued)

method for producing an ice cream product using an ice cream machine.

14 Claims, 2 Drawing Sheets

(51) Int. Cl.
  *A23G 9/28* (2006.01)
  *A23P 30/10* (2016.01)
  *A23P 30/20* (2016.01)

(52) U.S. Cl.
  CPC .............. *A23G 9/285* (2013.01); *A23P 30/10* (2016.08); *A23P 30/20* (2016.08)

(56) References Cited

U.S. PATENT DOCUMENTS

| | | |
|---|---|---|
| 4,212,609 A | 7/1980 | Fay |
| 4,539,894 A * | 9/1985 | Harris ................. F01B 17/04 91/480 |
| 4,584,933 A | 4/1986 | Price |
| 2002/0034569 A1 | 3/2002 | Tucker |
| 2007/0199423 A1 | 8/2007 | Capodieci |
| 2009/0011098 A1 | 1/2009 | Doehren |

FOREIGN PATENT DOCUMENTS

| | | |
|---|---|---|
| JP | S 62-087056 A | 4/1987 |
| JP | S 62-091148 A | 4/1987 |
| JP | 2002-517986 A | 6/2002 |
| WO | WO 99/65325 A1 | 12/1999 |

OTHER PUBLICATIONS

Office Action from corresponding Swedish Application No. 1550849-2 dated Dec. 11, 2015 (6 pages).

Office Action dated Mar. 16, 2020, in corresponding Japanese Application No. 2017-565274 (4 pgs.).

* cited by examiner

ICE CREAM MACHINE AND A METHOD FOR PRODUCING AN ICE CREAM PRODUCT USING AN ICE CREAM MACHINE

CROSS-REFERENCE TO RELATED PATENT APPLICATIONS

This is a National Phase of International Application No. PCT/EP2016/063881, filed Jun. 16, 2016, which claims the benefit of Swedish Application No. 1550849-2, filed Jun. 18, 2015. The entire contents of the above-referenced applications are expressly incorporated herein by reference.

TECHNICAL FIELD

The present invention relates to an ice cream machine having a filling zone and an emptying zone, and a method for producing an ice cream product using an ice cream machine.

BACKGROUND ART

In the ice cream producing industry ice cream, or an ice cream mixture, is used to produce ice cream products. In the process, the ice cream is extruded through an extrusion nozzle and subsequently cut into ice cream products by means of a cutting tool. The cutting tool may e.g. be a knife or a scrape. Additionally, an ice cream stick is often inserted into the ice cream to produce so called ice cream lollies. Thereafter, the ice cream products can be put on a conveyer tray or conveyer belt for further transportion to e.g. packaging and storing.

Some ice creams comprise inclusions or particles. These inclusions may cause a problem for the positioning of the stick in the ice cream as the inclusions may be located in a portion of the ice cream where the stick is to be inserted. Thus, the inclusions may cause a misplacement of the stick in the ice cream. Even if no inclusions are present in the ice cream mixture, a stick inserter arranged to inset the stick into the ice cream, may cause the sticks to be offset compared to its intentional position in the ice cream product. This may in turn cause the ice cream products to be misplaced on the conveyer tray.

Furthermore, even if no stick is included in the ice cream, the ice cream product may be misplaced on the conveyer tray due to e.g. a blunt or dull cutting tool hitting an inclusion and causing the ice cream product to unintentionally rotate.

There is thus a need for improving the state of the art to provide for an ice cream machine which at least partly solves these problems.

SUMMARY OF THE INVENTION

It is an object of the present invention to improve the current state of the art, to solve the above problems, and to provide an improved ice cream machine. These and other objects are achieved by an ice cream machine having a filling zone and an emptying zone, and a method for producing an ice cream product using an ice cream machine.

According to a first aspect of the present invention, an ice cream machine having a filling zone and an emptying zone is provided. The ice cream machine comprises a rotatable unit having a radial extension, a mould for receiving ice cream, said mould being arranged to rotate with said rotatable unit, an extrusion nozzle for extruding ice cream into said mould, said extrusion nozzle being arranged at said filling zone, and an ejection mechanism for ejecting ice cream radially out of said mould at said emptying zone.

By radially ejecting said ice cream, or ice cream product, out of said mould by an ejection mechanism, said ice cream, or ice cream product, may easily be detached from said mould and thereafter e.g. be put on a conveyer belt. With such an arrangement, the ice creams or ice cream products can be put on the conveyer tray in a repeatable manner with fewer misplaced ice cream products. Furthermore, the ice cream products can be put directly, or essentially directly, onto the conveyer belt as they are ejected radially. Thus, undesirable and uncontrollable falling or dropping of the ice cream products before reaching the conveyer tray may be reduced or even avoided. Furthermore, by using a rotatable unit, the ice cream machine can be made more compact.

It should be noted that the rotatable unit may preferably have a curved cross section. According to at least one example embodiment, the cross section is circular and the rotatable unit is formed as a rotatable wheel or as a rotatable cylinder, such as e.g. an open cylinder. According to at least one example embodiment, the cross section is ovally shaped.

In the embodiment where the rotatable unit is formed as a rotatable wheel or cylinder, the mould is preferably arranged as an indention in an outer wall of the wheel or cylinder. Here, the radial extension of the rotatable unit is comparable with an extension in the radial direction of the wheel or cylinder. In this embodiment, the ice cream or ice cream product is preferably ejected out of said mould in a outwardly radial direction, i.e. in a direction from a hub of said wheel or cylinder towards the outer wall of the wheel or cylinder.

The ejection mechanism may comprise a piston connected to said mould. The piston may be movable in the radial direction. Hereby, the piston may push said mould, or at least a part of said mould, in the radial direction. According to at least one example embodiment, a bottom of said mould is movable. For example, the bottom of said mould may be radially movable together with said piston. In this embodiment, lateral walls of the mould may e.g. comprised in a body of the rotatable unit, while the bottom of the mould is arranged to be movable within the body of the rotatable unit. The bottom may e.g. be arranged to be radially movable in such a way that the bottom can be moved from inside the body of the rotatable unit up to at least the circumference or periphery of the rotatable unit. In other words, in a first state, the mould is formed as an indention in the rotatable unit where the bottom of the mould is located inside the rotatable unit (e.g. when the mould is to be filled with ice cream at the filling zone), and in a second state, where the bottom of the mould has been moved closer to the circumference or periphery of the rotatable unit (i.e. closer to the outer wall of the rotatable unit) such that the indentions is smaller, or no longer present (e.g. when ejecting the ice cream from the mould at the emptying zone).

Hereby, the piston may push the bottom of said mould in a radial direction whereby the ice cream, or ice cream product, is ejected from said mould.

According to at least one example embodiment, the bottom of said mould is not movable, and said piston is arranged to move radially within said mould to push the ice cream, or ice cream product, in order to ejected it from said mould.

The ice cream machine may comprise a transporting zone between said filling zone and said emptying zone, wherein at said transporting zone said ejection mechanism is arranged to move said mould, or at least a bottom of said mould, radially inwards of said rotatable unit.

According to at least one example embodiment, further expansion of ice cream into the mould is prevented by arranging said ejection mechanism to move said mould, or at least a bottom of said mould, radially inwards at the later stage of the filling zone. In other words, when the mould has been filled with ice cream, an increase of the pressure inside the mould is prevented by already at the filling zone arranging said mould, or at least the bottom of said mould, to move radially inwards.

Hereby, the pressure inside the mould may be adjusted. For example, in the process of filling the mould with ice cream through the extrusion nozzle, an increase pressure (or overpressure) is often used. This overpressure may remain in the mould as the mould is typically covered from the surroundings until it reaches the emptying zone, i.e. until the ice cream, or ice cream product, is to be ejected from the mould. Here, the ice cream, or ice cream product, may be undesirably deformed due to the sudden release of the pressure in the mould. Thus, by moving the mould, or at least the bottom of said mould, radially inwards, the overpressure can be reduced in a controllable manner e.g. during the transportation of the mould between the filling zone and the emptying zone, and undesirably deformation of the ice cream product can be reduced.

Thus, by moving said mould, or at least a bottom of said mould, radially inwards after filling the mould with ice cream, the pressure inside the mould may be equalized before the mould is exposed to the surroundings, and the ice cream product is ejected out of the mould. Otherwise, the pressure will be equalized at the moment the mould exposes the ice cream mixture therein to the surroundings. In that case, an undesired bulb may be formed on the ice cream product. The amount of which the mould, or at least a bottom of said mould, is moved radially inwards is dependent on e.g. the pressure used during filling of the mould and the air content (so called "overrun") in the ice cream. Furthermore, there can be some fluctuation in the supplying flow of ice cream to the mould, and hence the pressure of which the moulds are filled. For example, if the ice cream has 100% overrun, and the filling bar is 0.5 bar, the mould, or at least the bottom of the mould, should be moved approximately inwards of about ⅛ of the final depth of the mould. For example, if the final depth of the mould is 24 mm, the mould, or at least the bottom of the mould, should be moved radially inwards approximately 3 mm. Thus, in this example, the mould has a depth of 21 mm during filling of the mould with ice cream. For a higher filling pressure, the mould, or at least the bottom of the mould, may have to be moved even further radially inwards.

According to at least one example embodiment, the mould, or at least the bottom of the mould is arranged to be moved radially inwards of between 0% and 20% as compared to the final depth of the mould. According to at least one example embodiment, the mould, or the bottom of the mould is arranged to be moved radially inwards of between 1 mm and 10 mm, such as e.g. between 1 mm and 5 mm.

According to at least one example embodiment, said ejection mechanism is arranged to move said bottom of said mould radially inwards of said rotatable unit.

It should be noted that in said transportation zone, the moulds and the ice cream therein are transported by being rotated together with said rotating unit. Hence, the transportation zone may be referred to as a rotating transportation zone.

The piston may be a reciprocal piston. For example, the piston may be reciprocal by being connected to a cam shaft arranged at a hub or a centre of the rotatable unit. According to at least one example embodiment, the piston is reciprocal by being pneumatic, hydraulic or electrically actuable.

By having a reciprocal piston, the piston may move in the radial direction, e.g. both inwardly and outwardly in the radial direction. The reciprocal piston may be referred to as a reciprocating piston. Thus, it should be understood that by being reciprocal or reciprocating, the piston may move back and forth, i.e. radially inwardly and outwardly, for example by contracting and expanding, respectively.

The ice cream machine may comprise at least two moulds, wherein the extrusion nozzle is arranged to cover more than one mould at said filling zone. Hereby, at least two moulds may simultaneously be filled with ice cream by the extrusion nozzle. It should be noted that the extrusion nozzle need not to cover the whole of said two moulds, but it is sufficient that the extrusion nozzle is covering at least a portion of each of said two moulds in order to be able to fill them simultaneously.

According to at least one example embodiment, the ice cream machine may comprise at least three moulds, wherein the extrusion nozzle is arranged to cover more than two moulds at said filling zone.

According to at least one example embodiment, a plurality of moulds is evenly arranged along the circumference or periphery of the rotatable unit.

The ice cream machine may comprise a sealing arranged to seal said extrusion nozzle to said rotatable unit. This is especially advantageous when the mould is filled with ice cream by the extrusion nozzle using an overpressure, as no, or little, ice cream is then allowed to slip out of the ice cream machine on the sides of the rotatable unit. According to at least one example embodiment, said extrusion nozzle comprises a boundary edge facing at least a portion of said rotatable unit, wherein said sealing is arranged to seal said extrusion nozzle to said rotatable unit, at least along said boundary edge. The sealing may be attached to the rotatable unit, the extrusion nozzle or both. The sealing may e.g. be a rubber sealing or a silicone sealing.

The ice cream machine may comprise a detaching mechanism arranged to detach said ice cream from said mould at said emptying zone, wherein said detaching mechanism is at least one of the following: a scrape, a wire, a pneumatic-driven system, an ultrasound cutting tool.

Thus, when the ejection mechanism has pushed the ice cream, or ice cream product, out of the mould at the emptying zone, the ice cream, or ice cream product is typically attached to the bottom of the mould (now e.g. being a part of the circumferential or periphery of the rotatable unit, i.e. the outer wall of the rotatable unit). Thus, the detaching mechanism may cut or push at a portion of the ice cream, or ice cream product, in such a way that it is detached from the bottom of said mould.

The pneumatic-driven system may e.g. be an air blow system which blows air through holes or apertures in the bottom of the mould. Thus, the ice cream, or ice cream product, can be detached from the bottom of the mould by the force or pressure supplied by the air. The air may e.g. be provided to the mould through the piston. In this embodiment, the bottom of said mould need not to be movable.

The ice cream machine may comprise a conveyer tray arranged to receive said ice cream, or ice cream products, from said mould at said emptying zone, wherein the rotational speed of the rotatable unit is adapted to the speed of the conveyer belt.

The speed of the conveyer belt may e.g. be the same as the rotational speed of the rotatable unit. Hereby, the ice cream, or ice cream products, may be put on the conveyer belt in repeatable manner.

The ice cream machine may comprise a stick providing arrangement arranged to provide a stick for said mould. In embodiments where the ice cream machine comprises more than one mould, the stick providing arrangement may be arranged to provide a stick to each mould.

The ice cream may thus be filled in the mould around the stick, and possible inclusions may therefore adapt their locations within mould in such a way that the risk of having a misplaced stick is reduced.

According to at least one example embodiment, the mould is arranged with a stick receiving portion. Hereby, the stick may be positioned in the mould in the stick receiving portion prior to filling the mould with ice cream, for example in a stick providing zone arranged between the emptying zone and the filling zone of the ice cream machine. Hereby, the stick has a predetermined location in the mould where it is intended to be positioned and regardless of whether inclusions are present in the ice cream or not, the risk of having a misplaced stick is reduced.

According to at least one example embodiment, the rotatable unit is connected to a motor for rotating the rotatable unit. The motor may e.g. be connected to the rotatable unit at a hub of the rotatable unit.

According to at least a second aspect of the present invention, a method for producing an ice cream product using an ice cream machine having an extrusion nozzle, a rotatable unit, at least one mould arranged to rotate with said rotatable unit, and an ejection mechanism is provided. The method comprises the steps of:

providing ice cream with or without inclusions;

extruding said ice cream through the extrusion nozzle into the mould;

ejecting said ice cream out of said mould using said ejection mechanism.

Effects and features of this second aspect of the present invention are largely analogous to those described above in connection with the first aspect of the inventive concept. Embodiments mentioned in relation to the first aspect of the present invention are largely compatible with the second aspect of the invention.

For example, according to at least one example embodiment, the step of ejecting said ice cream comprises using a piston to push said ice cream out of said mould in a radial direction of said rotatable unit.

According to at least one example embodiment, the ice cream machine comprises at least two moulds, and wherein the step of extruding said ice cream comprises extruding ice cream into more than one mould simultaneously.

According to at least one example embodiment, the ice cream machine is heated or cooled by some sort of heating and/or cooling means, in order for the ice cream machine to maintain a temperature suitable for the process. According to at least one example embodiment, the temperature of the ice cream machine is held at approximately 0 degrees Celsius.

It should be noted that throughout the application, the radial direction is referring to a direction substantially following the radial extension of the rotatable unit, or in a direction being substantially parallel to the radial extension of the rotatable unit. An inwardly radial direction (or a direction radially inwards) is indicating a direction from said mould towards a hub or centre of the rotatable unit, while an outwardly radial direction (or a direction radially outwards) is indicating a direction from said hub or centre of the rotatable unit towards said mould. The direction in which the ice cream, or ice cream product, is ejected from the mould need not to be entirely radial, but the ice cream, or ice cream product may be ejected out of said mould in a direction having an axial component as well. However, according to at least one example embodiment, the direction in which the ice cream, or ice cream product, is ejected from the mould is entirely radial.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1:
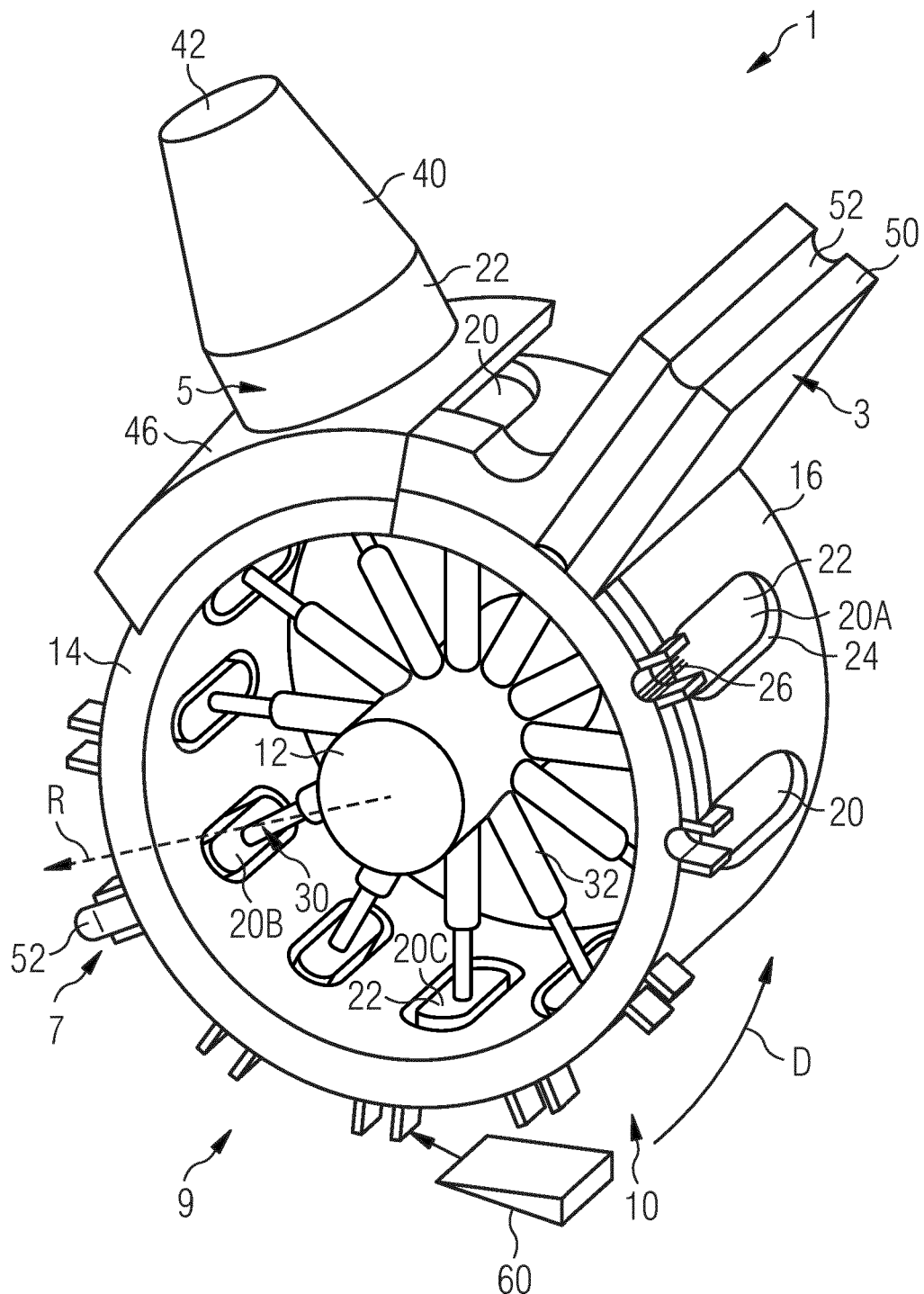
FIG. 1 is a perspective view of an ice cream machine in accordance with at least one embodiment of the invention.

FIG. 1 shows an ice cream machine 1 in accordance with one embodiment of the present invention. The ice cream machine 1 comprises a rotatable unit 10, a plurality of moulds 20 (of which only some are indicated) each mould 20 being provided with an ejection mechanism 30. The ice cream machine 1 further comprises an extrusion nozzle 40 and a stick providing arrangement 50.

The rotatable unit 10 of FIG. 1 is arranged as a rotatable wheel 10 having a hub 12 and a rotatable unit body 14. The rotatable unit 10 has an extension in the radial direction extending from the hub 12 towards the rotatable unit body 14 (indicated as a dashed arrow with the letter R in FIG. 1). The rotatable unit body 14 is formed as an open cylinder 14 having an extension in the radial direction R. An outer wall 16 of the rotatable unit body 14 is facing away from the hub 12.

In FIG. 1, the moulds 20 are arranged to rotate in rotational direction D, with the rotatable unit 10, as each mould 20 is comprised in the rotatable unit 10 by being arranged in the rotatable unit body 14. Each mould 20 comprises a bottom 22, lateral walls 24 and a stick receiving portion 26 arranged to receive a stick 52 from the stick providing arrangement 50. In other words, each mould 20 is arranged as an indention 20 in the outer wall 16 of the rotatable unit body 14.

Each of the ejection mechanism 30 is associated with a mould 20, and comprises a piston 32. In FIG. 1, the pistons 32 (of which only some are indicated in FIG. 1) are arranged as the arms of a wheel in relation to the rotatable unit 10. Hence, the ejection mechanism 30 and its pistons 32 are rotatable with the rotatable unit 10. The pistons 32 are arranged to move radially inwards and radially outwards, preferably by being reciprocal pistons. Hence, by arranging each piston 32 to the bottom 22 of the moulds 20, and by providing a bottom 22 of the mould 20 which is movable, the bottom 22 of each mould 20 may move together with each associated piston 32 inside the rotatable unit body 14. As an alternative, the piston 32 may be arranged to move through the bottom 22 of the moulds 20.

The extrusion nozzle 40 is arranged to receive ice cream through a receiving portion 42, and extrude ice cream into the moulds 20. A sealing 44 is arranged to seal the extrusion nozzle 40 to the rotatable unit 10.

It should be noted that the rotatable unit 10 need not to be comprised by a single unit, but may comprise different parts and portions, such as e.g. the hub 12, the ejection mechanism 30 and the pistons 32 as being arranged as spokes of the rotatable unit 10, and the body 14 and outer wall 16 of the rotatable unit 10.

Figure 2:
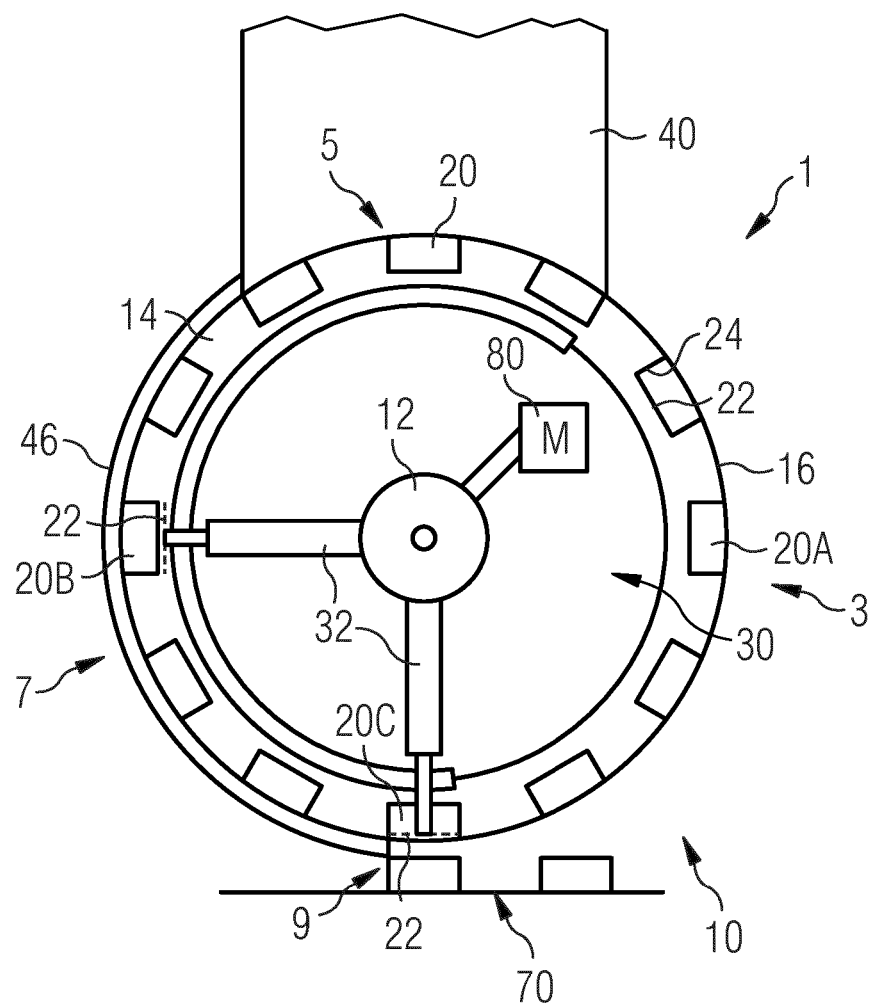
FIG. 2 illustrates in cross section, an ice cream machine in accordance with at least one embodiment of the invention.

The function of the ice cream machine 1 will now be described in further detail with respect to FIGS. 1 and 2. For illustrative purposes in FIG. 2, the stick providing arrangement 50 has been dispensed with. Furthermore, and for the same reasons, only two pistons 32 are shown in FIG. 2, and only some of the moulds 20 are indicated.

The ice cream machine 1 comprises a stick providing zone 3, a filling zone 5, a transportation zone 7, an emptying zone 9. The rotatable unit 10 and the moulds 20 are arranged to rotate between these zones 3, 5, 7, 9. In FIGS. 1 and 2, the moulds are arranged 20 rotate in a clockwise direction (the direction of rotation is perpendicular to the radial direction R of the rotatable unit 10 and is indicated by the curved arrow D).

The stick providing arrangement 50 (shown in FIG. 1 only) is arranged in the stick providing zone 3, prior to the filling zone 5, and is arranged to provide each mould 20 with a stick 52, as the moulds 20 are rotated passed the stick providing arrangement 50. In other words, the stick 52 may be provided to the mould 20 prior to filling the mould 20 with ice cream. According to at least one alternative example embodiment, the stick providing arrangement 50 (shown in FIG. 1 only) is arranged after the filling zone 5. In FIG. 1, mould 20A has a stick receiving portion 26, and the intended stick to be provided by the stick providing arrangement 50 is indicated by dashed lines. For illustrative purposes, stick 52 of mould 20B is shown.

In the filling zone 5, the extrusion nozzle 40 extrudes ice cream into the mould 20, or moulds 20, positioned in fluid contact with the extrusion nozzle 40. Preferably, the extrusion nozzle 40 is arranged to be in fluid contact with more than one mould 20 at the same time, i.e. preferably the extrusion nozzle 40 is arranged to fill more than one mould 20 with ice cream at the same time. Hereby, the filling of the moulds 20 can be carried out more efficiently possibly without interruption of the rotation of the rotatable unit 10 during the process. Furthermore, the rotational speed of the rotatable unit 10 and the moulds 20 can be set higher.

The filling of the moulds 20 with ice cream by the extrusion nozzle 40 is preferably carried out with an increased pressure as compared to the surroundings (i.e. an overpressure). Hereby, the filling of the ice cream can be carried out in an efficient manner, and the ice cream, with our without inclusions can efficiently be arranged around the stick 52 in the mould 20.

It should be noted that in FIG. 1, only the filling zone 5 is illustrated as being covered by a cover 46 for illustrative purposes. However, according to one example embodiment, the moulds 20 are covered by the cover 46 in the filling zone 5 and in the transportation zone 7 (i.e. from the filling zone 5 up to the emptying zone 9) and are hence separated from the surroundings by the cover 46, as illustrated in FIG. 2.

Subsequently, the moulds 20 enter the transportation zone 7 as they continue to rotate with the rotatable unit 10 towards the emptying zone 9. In the transportation zone 7, the ejection mechanism 30 associated with each mould 20 is arranged to move radially inwards towards the hub 12. This is illustrated by that the bottom 22 of mould 20B in FIG. 2, represented by a dashed line, is withdrawn further towards the hub 12 compared to e.g. the bottom 22 of mould 20A. Hereby, the bottom 22 of each mould 20 in the transportation zone 7 can be moved towards the hub 12, i.e. radially inwards, whereby the overpressure in the moulds 20 (stemming from filling the moulds 20 with ice cream) can be decreased or even eliminated. Hereby, the risk of deformation of the ice cream product during ejection of the ice cream product from the mould 20, and/or mispositioning of the stick 52 in the ice cream product, can be reduced.

After the transportation zone 7, the moulds enter the emptying zone 9, where the ice cream, or ice cream product, is intended to be detached from its mould 20, and put on e.g. a conveyer tray 70 or conveyer belt 70 (shown only in FIG. 2). In the emptying zone 9, the ejection mechanism 30 pushes the ice cream, or ice cream product out of the respective mould 20. As illustrated in FIGS. 1 and 2, each piston 32 is movable radially outwards and is able to push the bottom 22 of each mould 20 radially outwards whereby the ice cream or ice cream product is ejected out of its mould 20. This is illustrated by that the bottom 22 of mould 20C in FIG. 2, represented by a dashed line, is arranged further away from the hub 12 as compared to e.g. the bottom 22 of mould 20A. At this stage, the ice cream, or ice cream product, is typically attached to the bottom 22 of the mould 20, and as the bottom 22 of the mould 20 has been pushed out of the rotatable unit body 14 of the rotatable unit 10, there are no longer any lateral sides 24 of the mould 20, and the bottom 22 of the mould 20 is substantially a part of the outer wall 16 of the rotatable unit body 14.

At the emptying zone 9, a detaching mechanism 60 (shown only in FIG. 1) is arranged to detach the ice cream, or ice cream product, from the mould. In FIG. 1, the detaching mechanism is formed as a scrape 60 arranged to move in the direction of the indicated arrow along the bottom 22 of the mould 20C whereby the ice cream, or ice cream product, will detach from the mould 20C. The detaching mechanism may also be a wire, (heated or not heated), arranged in a fixed position under the rotatable unit 10. It should be noted that in FIG. 1, the pushed-out bottom 22 of the mould 20C is not shown, only the stick receiving portions 26 of the moulds 20 are shown. Other detaching mechanism can be used, such as e.g. a scrape, a wire, a pneumatic-driven system, an ultrasound cutting tool.

After detaching the ice cream, or ice cream products, from the moulds 20, a conveyer tray 70 or conveyer belt 70 is preferably used for further transportation of the ice cream, or ice cream products.

As illustrated in FIG. 2, the rotatable unit 10 may be driven by a motor 80. The motor 80 may e.g. be electrically driven and may be connected to the hub 12 of the rotatable unit 10.

Figure 3:
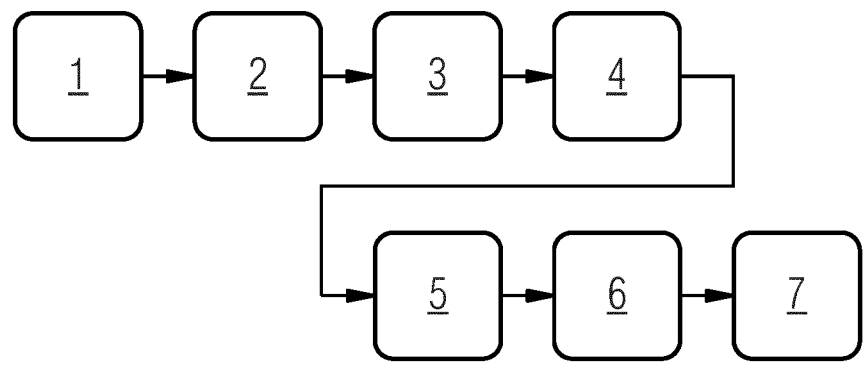
FIG. 3 is a flow-chart schematically illustrating at least one example embodiment of the invention.

The flow-chart in FIG. 3 schematically illustrates a method for producing an ice cream product using an ice cream machine 1 as described with reference to FIGS. 1 and 2 (hence, the reference numerals of FIGS. 1 and 2 are used below when describing the steps of the method in the flow-chart in FIG. 3).

In a first step 1, a stick 52 is provided by the stick providing arrangement 50 to a stick receiving portion 26 of a mould 20 in the stick providing zone 3.

In a subsequent step 2, ice cream, with or without inclusions, are provided to the extrusion nozzle 40.

In a subsequent step 3 the ice cream is extruded through the extrusion nozzle 40 into the mould 20, in the filling zone 5. Preferably, and in the embodiments of the invention comprising more than one mould 20, more than one mould 20 is filled at the same time.

In a subsequent step 4, the ejection mechanism 30 associated with the mould 20 is moved radially inwards in order to decrease the pressure inside the mould 20.

In a subsequent step 5, the ejection mechanism 30 associated with the mould 20 is moved radially outwards in order to eject the ice cream, or ice cream product from the mould 20.

In a subsequent step 6, the detaching mechanism 60 detaches the ice cream, or ice cream product, from the bottom 22 of the mould 20.

In a subsequent step 7, the ice cream, or ice cream product, is put on a conveyer tray 70 or conveyer belt 70 for further transportation.

The skilled person realizes that a number of modifications of the embodiments described herein are possible without departing from the scope of the invention, which is defined in the appended claims.

For instance, the invention is not limited to the number of moulds, an ice cream machine having only a single mould is within the concept of the present invention. Furthermore, the moulds need no to be integrated into the rotatable unit, but may be arranged externally of the rotatable unit. The design of the rotatable unit may also be varied, e.g. by changing the geometrical shape of the unit. Furthermore, there may be more and/or other zones of the ice cream machine besides the filling zone, the transportation zone, the emptying zone and the stick providing zone described in this application. The more and/or other zones may be related to the same or other functions as those mentioned in this application.

The invention claimed is:

1. An ice cream machine having a filling zone and an emptying zone, the ice cream machine comprising:
   a rotatable unit having a radial extension;
   a mold configured to receive ice cream, the mold being configured to rotate with the rotatable unit;
   an extrusion nozzle configured to extrude ice cream into the mold, the extrusion nozzle being arranged at the filling zone;
   a stick providing arrangement in a stick providing zone between the filling zone and the emptying zone, wherein the stick providing arrangement is configured to provide the mold with a stick as the mold is rotated past the stick providing zone, such that the stick is provided to the mold prior to filling the mold with ice cream; and
   an ejection mechanism configured to eject ice cream radially out of the mold at the emptying zone.

2. An ice cream machine according to claim 1, wherein the ejection mechanism comprises a piston connected to the mold.

3. An ice cream machine according to claim 2, wherein a bottom of the mold is radially movable together with the piston.

4. An ice cream machine according to claim 3, wherein while the mold moves between the filling zone and the emptying zone, the piston is configured to move the bottom of the mold relative to a lateral wall of the mold.

5. An ice cream machine according to claim 4, wherein the piston is configured to move the bottom of the mold radially inwards, toward a center of the rotatable unit, relative to the lateral wall of the mold.

6. An ice cream machine according to claim 2, wherein the piston is a reciprocal piston.

7. An ice cream machine according to claim 6, wherein the piston is reciprocal by being connected to a cam shaft arranged at a hub of the rotatable unit.

8. An ice cream machine according to claim 6, wherein the piston is reciprocal by being pneumatic, hydraulic, or electrically actuable.

9. An ice cream machine according to claim 1, comprising a transporting zone between the filling zone and the emptying zone, wherein at the transporting zone, the ejection mechanism is configured to move the mold radially inwards of the rotatable unit.

10. An ice cream machine according to claim 1, comprising at least two molds, wherein the extrusion nozzle is configured to cover more than one mold at the filling zone.

11. An ice cream machine according to claim 10, wherein the stick providing arrangement is configured to provide a stick for each mold.

12. An ice cream machine according to claim 1, comprising a sealing configured to seal the extrusion nozzle to the rotatable unit.

13. An ice cream machine according to claim 1, comprising a detaching mechanism configured to detach the ice cream from the mold at the emptying zone, wherein the detaching mechanism is at least one of a scrape, a wire, a pneumatic-driven system, or an ultrasound cutting tool.

14. An ice cream machine according to claim 1, comprising a conveyer tray configured to receive the ice cream from the mold at the emptying zone, wherein the rotational speed of the rotatable unit is adapted to the speed of the conveyer tray.

* * * * *